United States Patent
Corrubia et al.

[11] Patent Number: 5,867,119
[45] Date of Patent: Feb. 2, 1999

[54] PRECISION HEIGHT MEASURING DEVICE

[75] Inventors: Stacie K. Corrubia, Webster Groves; Dale A. Fogle, St. Louis; Robert H. Goebel, Chesterfield, all of Mo.

[73] Assignee: McDonnell Douglas Corporation, St. Louis, Mo.

[21] Appl. No.: 942,751

[22] Filed: Oct. 2, 1997

[51] Int. Cl.$^6$ ...................................................... G01S 13/08
[52] U.S. Cl. ........................ 342/120; 342/123; 342/145; 342/194
[58] Field of Search ................................... 342/123, 120, 342/121, 122, 145, 156, 194

[56] References Cited

U.S. PATENT DOCUMENTS

| | | | |
|---|---|---|---|
| 3,731,310 | 5/1973 | Rittenbach | 343/17.1 |
| 4,103,302 | 7/1978 | Roeder et al. | 342/113 |
| 4,106,017 | 8/1978 | Roeder et al. | 342/88 |
| 4,359,732 | 11/1982 | Martin | 343/5 CM |
| 4,635,060 | 1/1987 | Mertens | 342/194 |
| 4,682,175 | 7/1987 | Lazarus | 342/165 |
| 4,717,916 | 1/1988 | Adams et al. | 342/107 |
| 4,922,254 | 5/1990 | Schuessler et al. | 342/25 |
| 5,170,171 | 12/1992 | Brown | 342/191 |
| 5,260,708 | 11/1993 | Auterman | 342/25 |
| 5,424,743 | 6/1995 | Ghiglia et al. | 342/25 |
| 5,677,693 | 10/1997 | Frankot et al. | 342/25 |

*Primary Examiner*—John B. Sotomayor
*Attorney, Agent, or Firm*—Senniger, Powers, Leavitt & Roedel

[57] ABSTRACT

An apparatus for measuring the height and cross-track offset of a surface location from a moving platform is defined. First and second antennas positioned on an underside of the platform are directed downwardly toward the surface. A transmitter associated with one of the antennas transmits a signal toward the surface. A first coherent detector associated with the first antenna detects a received signal corresponding to the transmitted signal as reflected by the surface and generates in-phase and quadrature components of the detected signal relative to the transmitted signal. A second coherent detector associated with the second antenna detects a received signal corresponding to the transmitted signal as reflected by the surface and generates a second set of in-phase and quadrature components of the detected signal relative to the transmitted signal. An analog to digital (A/D) converter converts the in-phase and quadrature components into digital information stored in a memory. A digital signal processor processing the digital information stored in the memory determines the height and cross-track offset of the surface location.

20 Claims, 2 Drawing Sheets

PRECISION HEIGHT MEASURING DEVICE

TECHNICAL FIELD

The invention generally relates to an apparatus for measuring the height and cross-track offset of a surface point from a moving platform, such as an aircraft or missile, using doppler processing and interferometry. In particular, the invention generates a sensed array of altitudes and cross-track offsets that can be used to provide automatic position location for a moving platform by correlating the sensed array with a stored terrain reference.

BACKGROUND ART

Systems which provide terrain contour mapping (TERCOM) have been used in the past to provide position location information for moving platforms such as aircraft and missiles. For example, U.S. Pat. No. 5,170,171, incorporated herein by reference in its entirety, describes a system for three-dimensional interferometric synthetic aperture radar terrain mapping employing altitude measurement. In such systems, synthetic aperture radar data is used in combination with separately generated altimeter data to produce a terrain map corrected for platform roll angle. In general, such systems use two synthetic radar antennas and a ranging altimeter located on the aircraft.

Another system which is able to provide a terrain map is disclosed in U.S. Pat. No. 5,260,708, also incorporated herein by reference in its entirety. In this system, a three-dimensional interferometric synthetic aperture radar terrain mapping is described in which unambiguous phase unwrapping employing subset bandwidth processing is used. As with the former system, this system employs two radar receivers which process echo signals conventionally to yield slant range and doppler frequency data for plural resolution cells. The measured phase difference for each resolution cell provides an ambiguous measure of slant range difference to the two antennas needed to determine terrain evaluation and correct ground range. The received echo data is reprocessed using less than the entire bandwidth of the radar transmission to achieve additional center wave lengths. This produces a differing ambiguity interval and permits unambiguous determination of the slant range difference. The average altitude is separately determined by a ranging altimeter.

Other topographical mapping radar systems, such as disclosed in U.S. Pat. No. 4,359,732, incorporated herein by reference in its entirety, use two vertically spaced fan beam antennas to provide terrain contour mapping. This radar transmission is normal to the flight path and to the side of the aircraft.

Although such systems have been effective in mapping terrain, their accuracy is somewhat limited by the accuracy of the separately generated altimeter information. With the advent of real time digital signal processing, there is a need for an improved system which can accurately determine the height of a platform above the surface so that this information can be used to more accurately provide contour mapping.

DISCLOSURE OF THE INVENTION

The invention meets the above needs and overcomes the deficiencies of the prior art by eliminating the need for a reference map transformation. One advantage of this invention is the capability of obtaining accurate position fixes at higher altitudes without the use of a reference map transformation (transforming a terrain map to match the altitudes measured from a standard high altitude altimeter). This invention employs the interferometric and doppler processing to determine the terrain height. Ideally, the terrain height measurement would be independent of platform altitude. When the device of the invention is coupled with a correlator and an acceptable reference, an extremely accurate three-dimensional position location system is provided. The invention accomplishes this increase in accuracy by using doppler information in the reflected radar signal and interferometric processing to determine range and cross-track offset.

Operation of the device according to the invention provides very high resolution height measurement of objects over which the platform is flying. This allows a three-dimensional resolution to be provided with high accuracy. This extremely high resolution is an important aspect of the invention. The device of the invention uses in-phase and quadrature measurements of the reflected radar signals to isolate the radar signal returning from the doppler interval directly below the radar. This signal is thresholded to obtain the range to the first return. Interferometric processing of the returns from two antennas that are separated in the cross-track direction gives the elevation angle of the range vector. The range and elevation angle are used to compute the terrain height and the cross-track offset of the terrain height. As a result, this invention meets the need of a more accurate precision height measuring device so that more accurate terrain mapping, more accurate navigational updating, higher quality precision guidance, and autonomous landing improvements can be utilized. Additional uses of the invention include ground proximity warning, three-dimensional ground/object mapping, height above object measurements and other accurate distance measurements.

Furthermore, the fact that the invention may be implemented in real time as part of a digital signal processing system allows the software of existing digital mapping systems to be modified to include the invention without the need for additional hardware. The primary purpose of the invention is to provide the measurement of the height and cross-track offset of the terrain below the vehicles at all platform altitudes. This is accomplished by using doppler processing and interferometric processing of the returns from two antennas that are closely spaced in the cross-track direction.

The implementation of downwardly looking symmetrical antennas permits such systems to be used in any type of mobile platform such as aircraft and rockets. The need for the close proximity of the antennas further enhances the ability of such a system to be used on smaller, more compact moving platforms. Some of the resulting advantages include greater accuracy along with reduced costs. The invention also allows quick, real time positioning of the platform in the event that such information is necessary to determine future guidance or direction information.

In one form, the invention comprises an apparatus for measuring a distance between a platform and a surface. First and second antennas are separated in the cross-track direction and directed downward toward the surface. A transmitter is associated with at least one of the antennas for transmitting a signal toward the surface. A first coherent detector associated with the first antenna detects a received signal corresponding to the transmitted signal as reflected by the surface. The coherent detector generates an in-phase and a quadrature component of the detected signal relative to the transmitted signal. A second coherent detector associated with the second antenna detects a received signal corresponding to the transmitted signal as reflected by the surface.

The second coherent detector generates an in-phase and a quadrature component of the detected signal relative to the transmitted signal. An A/D converter converts the analog quadrature and in-phase components into digital information stored in a memory. A digital signal processor processes the digital information stored in the memory to determine the distance between the platform and a point or location on the surface using doppler and interferometric processing.

Other objects and features will be in part apparent and in part pointed out hereinafter.

BEST MODES FOR CARRYING OUT THE INVENTION

Figure 1:
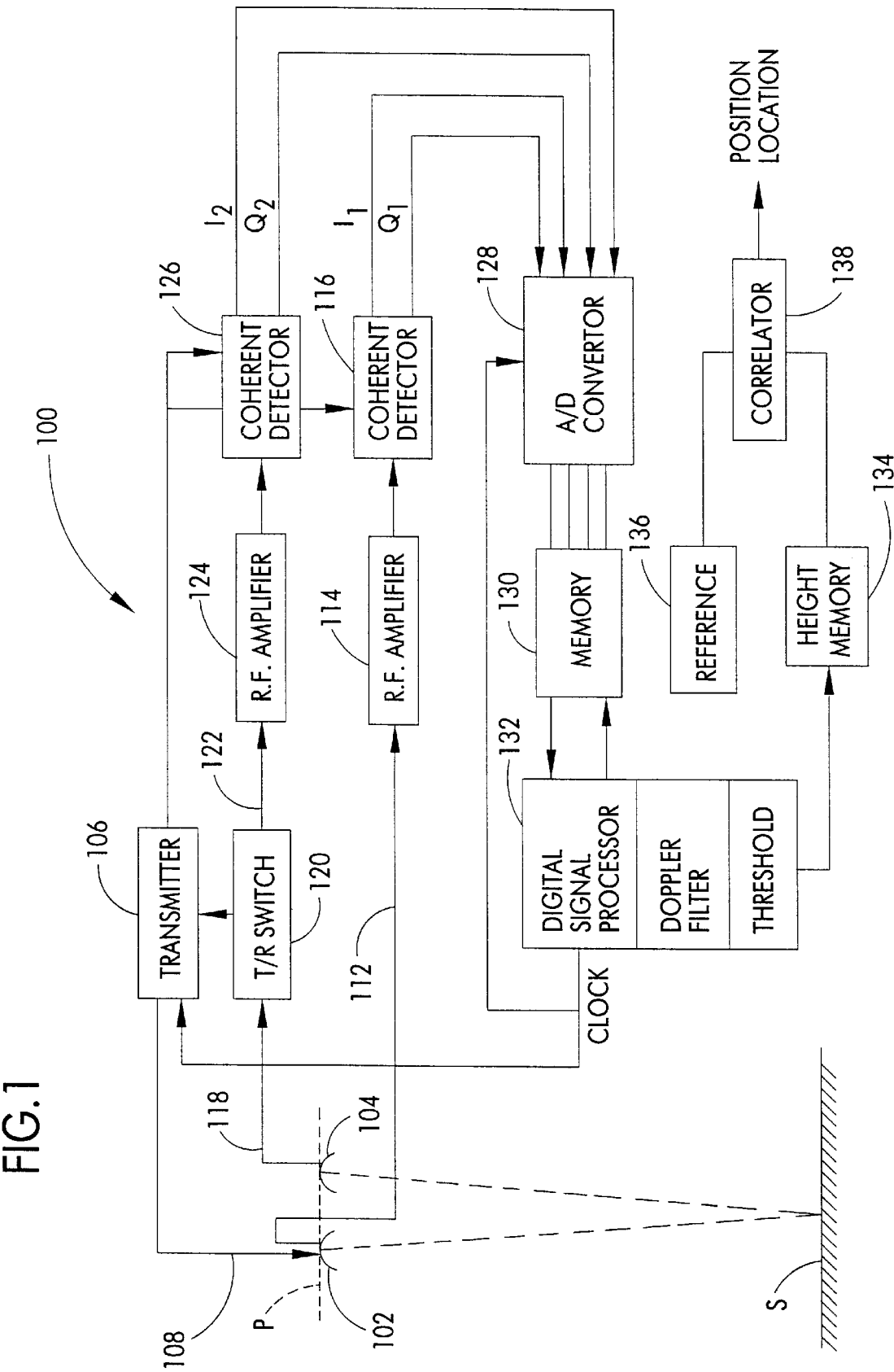
FIG. 1 is a block diagram of a precision terrain height measuring apparatus according to the invention used in combination with a reference and a correlator to provide position location information.
Figure 2:
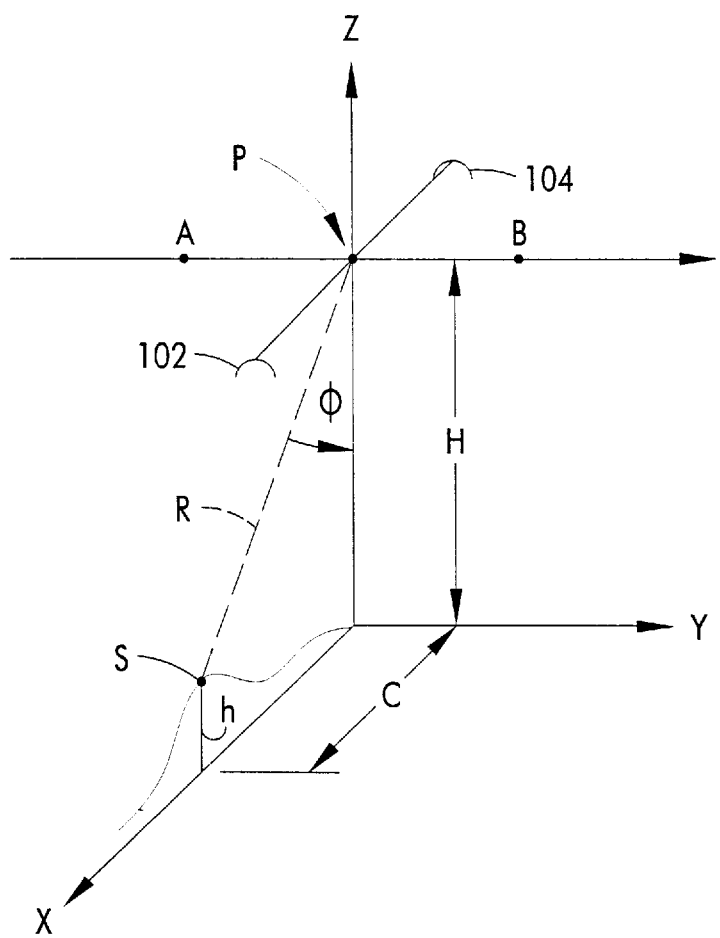
FIG. 2 is a graphical illustration of the relationships between the platform and the surface.

Referring to FIG. 1, a block diagram of one preferred embodiment of a precision height measuring apparatus 100 according to the invention is illustrated. As shown in FIG. 2, the apparatus 100 is for measuring a distance R between a platform P and a surface location S. The schematic diagram of the relationships between the platform P and the surface location S is not to scale and somewhat exaggerated in order to clearly illustrate these aspects of the invention. First and second antennas 102, 104 which are separated by about one foot in the cross-track (x) direction are adapted to be positioned at the platform P and directed downwardly toward the surface location S. A transmitter 106 associated with at least one of the antennas transmits a signal toward the surface location S. As illustrated in FIG. 1, line 108 directly connects the transmitter 106 to first antenna 102.

The signal radiated by the first antenna is directed downwardly toward the surface location S which reflects the radiated signal so that it is received by both the first and second antennas 102, 104. The reflected signal received by antenna 102 is carried via line 112 to a radio frequency (rf) amplifier 114 for amplification and signal conditioning and further processing by a first coherent detector 116. Detector 116 generates an inphase component $I_1$ and a quadrature component $Q_1$ of the reflected signal which is detected by the first antenna 102. Similarly, the second antenna 104 detects the reflected signal which is carried by line 118 via a transmit/receive switch 120 (which will be discussed below), via line 122 to an rf amplifier 124 which amplifies and conditions the received signal and provides it to a second coherent detector 126. The second coherent detector 126 also generates in-phase and quadrature components $I_2$, $Q_2$ of the detected, reflected signal.

The in-phase and quadrature analog components are provided to an analog to digital (A/D) converter 128 which converts the analog signals into digital signals stored in a memory 130. A digital signal processor 132 processes the digital information stored in the memory 130 to determine a range R between the platform P and the surface location S and a cross-track offset C of this surface location. This calculation is performed using doppler and interferometric processing.

The processor 132 processes in real time the digital information stored in the memory 130 to determine the range R and the cross-track offset C of the surface location S. A doppler filter is applied to each range gate of the return signal from antenna 102 or the sum of the returns from antennas 102 and 104 as the platform moves from point A to point B in FIG. 2. The resultant signal which is from the doppler interval directly below the radar, is thresholded to determine the time delay of the first return. The range R to the surface location S is computed from this time delay. The phase angles of the signals received at the two antennas are computed using the quadrature components of these doppler filtered signals at the threshold crossing. The difference between these phase angles is used to compute the elevation angle $\phi$ of the range vector to the surface location S. The terrain height h and the cross-track offset C are then computed using the range R, the elevation angle $\phi$ and the barometric altitude H. The down-track location of the sensed height with respect to the vehicle can be obtained using the vertical tilt angle from on-board instrumentation such as an INS (Inertial Navigation System).

Optionally, the device 100 may be associated with a reference 136 defining a signature of the surface S and a correlator 138 for correlating the digital information in the memory 130 to the signature to determine the location of the position of the platform P.

As shown in FIG. 1, the transmitter 106 is directly connected to the first antenna 102 via line 108. The transmit/receive switch 120 is normally in the receive mode. After antenna 104 receives a reflected signal, the switch 120 automatically switches for a brief period of time into a transmit mode to energize the transmitter 106 so that antenna 102 transmits a signal toward the surface S. The switch 120 is located between the antenna 104 and amplifier 124 and is generally transparent in the receive mode to any signals received by the antenna 104.

Preferably, the moving platform P is an airplane or rocket or other vehicle moving over the surface such as the earth's surface. Antennas 102 and 104 would be mounted approximately one foot apart in the cross-track direction so that they would form a narrow doppler gate measuring the frequency of return of the reflected signal. The antennas need to be close enough so that this is a single doppler gate in the down-track direction thereby avoiding any ambiguities.

Although the system of the invention has been described with particular regard to its use as a precision terrain height measuring device, those skilled in the art will recognize other applications of the system. For example, the device of the invention may be used to monitor changes in height of various structures. In addition, the system of the invention is useful to provide a high resolution position location technique.

Also, those skilled in the art will recognize that various other components may be used as part of the system according to the invention. For example, the amplification and detecting, which is shown in FIG. 1 in analog form, may be accomplished by digital processing so that the entire invention is digital. Also, the processing to determine the cross-track and range locations can be done totally in analog processing or with the use of hybrid analog/digital circuits in place of, or in addition to the digital signal processor.

Also, those skilled in the art will recognize that the device of the invention may be used as part of, or in combination with other systems such as space exploration systems.

In view of the above, it will be seen that the several objects of the invention are achieved and other advantageous results attained.

As various changes could be made in the above products without departing from the scope of the invention, it is intended that all matter contained in the above description and shown in the accompanying drawing shall be interpreted as illustrative and not in a limiting sense.

What is claimed is:

1. An apparatus for measuring a range of a surface location from a platform:

first and second antennas adapted to be positioned at the platform and directed downward toward the surface;

a transmitter associated with at least one of the antennas for transmitting a signal toward the surface;

a first coherent detector associated with the first antenna for detecting a received signal corresponding to the transmitted signal as reflected by the surface and for generating an in-phase and a quadrature component of the detected signal relative to the transmitted signal;

a second coherent detector associated with the second antenna for detecting a received signal corresponding to the transmitted signal as reflected by the surface and for generating an in-phase and a quadrature component of the detected signal relative to the transmitted signal;

a memory;

an analog to digital (A/D) converter for converting the in-phase and quadrature components into digital information stored in the memory; and a digital signal processor processing the digital information stored in the memory to determine the range of the surface location from the platform.

2. The apparatus of claim 1 wherein the digital signal processor determines from the digital information stored in memory a cross-track offset of the surface location relative to the platform.

3. The apparatus of claim 1 wherein the digital signal processor processes the quadrature components of the digital information stored in the memory to determine the elevation angle of the surface location relative to the platform.

4. The apparatus of claim 1 further comprising a reference defining a signature of the surface and a correlator for correlating the digital information to the signature to determine position location of the platform.

5. The apparatus of claim 1 wherein the digital signal processor processes the digital information stored in the memory by interferometric phase measurement processing to determine the cross-track offset.

6. The apparatus of claim 1 wherein the digital signal processor processes the quadrature components of the digital information stored in the memory by doppler filtering at a threshold crossing to determine the range to the received signal.

7. The apparatus of claim 6 wherein the digital signal processor processes the digital information stored in the memory by interferometric phase measurement processing to determine the cross-track offset.

8. The apparatus of claim 7 wherein the digital signal processor determines from the digital information stored in memory a cross-track offset of the surface location relative to the platform.

9. The apparatus of claim 8 wherein the digital signal processor processes the quadrature components of the digital information stored in the memory to determine the elevation angle of the surface location relative to the platform.

10. The apparatus of claim 6 further comprising a reference defining a signature of the surface and a correlator for correlating the digital information to the signature to determine position location of the platform.

11. An apparatus for measuring terrain height of a surface location from a moving platform such as an aircraft, said apparatus comprising:

first and second antennas adapted to be positioned on an underside of the platform directed downward toward the surface;

a transmitter associated with one of the antennas for transmitting a signal toward the surface;

a first coherent detector associated with the first antenna for detecting a received signal corresponding to the transmitted signal as reflected by the surface and for generating an in-phase and quadrature component of the detected signal relative to the transmitted signal;

a second coherent detector associated with the second antenna for detecting a received signal corresponding to the transmitted signal as reflected by the surface and for generating an in-phase and quadrature component of the detected signal relative to the transmitted signal;

a memory;

an analog to digital (A/D) converter for converting the in-phase and quadrature components into digital information stored in the memory; and a digital signal processor processing the digital information stored in the memory to determine the surface height between the platform and the location.

12. The apparatus of claim 11 wherein the digital signal processor determines from the digital information stored in memory a cross-track offset of the platform relative to the surface location.

13. The apparatus of claim 11 wherein the digital signal processor processes the quadrature components of the digital information stored in the memory to determine an elevation angle of the platform relative to the surface point.

14. The apparatus of claim 11 further comprising a reference defining a signature of the surface and a correlator for correlating the digital information to the signature to determine position location of the platform.

15. The apparatus of claim 11 wherein the digital signal processor processes the digital information stored in the memory by interferometric phase measurement processing to determine the cross-track offset.

16. The apparatus of claim 11 wherein the digital signal processor processes the quadrature components of the digital information stored in the memory by doppler filtering at a threshold crossing to determine the range to the received signal.

17. The apparatus of claim 16 wherein the digital signal processor processes the digital information stored in the memory by interferometric phase measurement processing to determine the cross-track offset.

18. The apparatus of claim 17 wherein the digital signal processor determines from the digital information stored in memory a cross-track offset of the surface location relative to the platform.

19. The apparatus of claim 18 wherein the digital signal processor processes the quadrature components of the digital information stored in the memory to determine the elevation angle of the surface location relative to the platform.

20. The apparatus of claim 16 further comprising a reference defining a signature of the surface and a correlator for correlating the digital information to the signature to determine position location of the platform.

* * * * *